United States Patent
Shi

(10) Patent No.: US 8,599,907 B2
(45) Date of Patent: Dec. 3, 2013

(54) METHOD AND DEVICE FOR PERFORMING COMMUNICATION IN DIGITAL SUBSCRIBER LINE

(75) Inventor: Qingquan Shi, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/491,234

(22) Filed: Jun. 7, 2012

(65) Prior Publication Data

US 2012/0243588 A1    Sep. 27, 2012

Related U.S. Application Data

(63) Continuation of application No. 12/249,659, filed on Oct. 10, 2008, now Pat. No. 8,213,488, which is a continuation of application No. PCT/CN2007/000196, filed on Jan. 18, 2007.

(30) Foreign Application Priority Data

Apr. 13, 2006    (CN) .......................... 2006 1 0072439

(51) Int. Cl.
   *H04B 1/38*    (2006.01)
   *H04L 5/16*    (2006.01)

(52) U.S. Cl.
   USPC .......................................... 375/219; 375/222

(58) Field of Classification Search
   USPC .................. 375/219, 222, 227, 260, 285; 379/27.01, 27.03
   See application file for complete search history.

(56) References Cited

U.S. PATENT DOCUMENTS

| | | | |
|---|---|---|---|
| 6,072,779 A * | 6/2000 | Tzannes et al. | 370/252 |
| 6,567,473 B1 * | 5/2003 | Tzannes | 375/260 |
| 6,654,410 B2 * | 11/2003 | Tzannes | 375/222 |
| 6,829,307 B1 | 12/2004 | Hoo et al. | |
| 7,535,885 B2 | 5/2009 | Horneman et al. | |
| 7,720,136 B2 | 5/2010 | Friedman et al. | |
| 7,738,543 B2 | 6/2010 | Oksman | |

(Continued)

FOREIGN PATENT DOCUMENTS

| | | |
|---|---|---|
| CN | 1613190 | 5/2005 |
| CN | 1613190 A | 5/2005 |

(Continued)

OTHER PUBLICATIONS

Communication issued in corresponding European Patent Application No. 07702128.5, mailed Oct. 23, 2012.

(Continued)

*Primary Examiner* — Khanh C Tran
(74) *Attorney, Agent, or Firm* — Brinks Gilson & Lione

(57) ABSTRACT

This disclosure provides a method and transceiver for a for a digital subscriber line (DSL) system. A first transceiver calculates a first table including a parameter of bit allocation for sub-carriers and transmits a switch message to a second transceiver connected thereto when a communication performance parameter reaches or exceeds the predetermined value; in response to the switch message, the second transceiver calculating a second table including a parameter of bit allocation for sub-carriers based on a calculation rule to keep the parameter of bit allocation within the second table as same as that within the first table, and the first transceiver communicates with the second transceiver using the first table and from a certain symbol to implement synchronous switch.

16 Claims, 4 Drawing Sheets

(56) References Cited

U.S. PATENT DOCUMENTS

| | | | |
|---|---|---|---|
| 7,860,153 B2 | 12/2010 | Sato | |
| 2002/0137467 A1 | 9/2002 | Tzannes | |
| 2004/0258142 A1 | 12/2004 | Tzannes | |
| 2006/0034360 A1 | 2/2006 | Tzannes | |
| 2006/0182169 A1 | 8/2006 | Tzannes | |
| 2007/0248154 A1* | 10/2007 | Gross et al. | 375/222 |

FOREIGN PATENT DOCUMENTS

| | | |
|---|---|---|
| CN | 1716989 | 1/2006 |
| WO | 00/54473 A1 | 9/2000 |
| WO | WO 03/043213 A1 | 5/2003 |

OTHER PUBLICATIONS

Written Opinion of the International Searching Authority issued in corresponding PCT Patent Application No. PCT/CN2007/000196, mailed Apr. 26, 2007.

Search Report Issued in corresponding PCT Application No. PCT/CN2007/000196; mailed Apr. 26, 2007.

Supplementary European Search Report issued in corresponding European Patent Application No. 07702128.5; mailed May 6, 2009.

Office Action issued in corresponding Chinese Patent Application No. 2006100724390; issued Oct. 30, 2009.

Office Action issued in corresponding Australian Patent Application No. 2007240059; issued Feb. 10, 2010.

"Series G: Transmission Systems and Media, Digital Systems and Networks—Digital Sections and Digital Line System—Access Networks—Test Procedures for Digital Subscriber Line (DSL) Transceivers" Telecommunication Standardization Sector of ITU. Feb. 2001.

"Series G: Transmission Systems and Media, Digital Systems and Networks—Digital Sections and Digital Line System—Access Networks—Asymmetric Digital Subscriber Line Transceivers 2 (ADSL2)" Telecommunication Standardization Sector of ITU. Jan. 2005.

"Series G: Transmission Systems and Media, Digital Systems and Networks—Digital Sections and Digital Line System—Access Networks—Very High Speed Digital Subscriber Line Transceivers 2 (VDSL2)" Telecommunication Standardization Sector of ITU. Feb. 2006.

"Series G: Transmission Systems and Media, Digital Systems and Networks—Digital Sections and Digital Line System—Access Networks—Physical Layer Management for Digital Subscriber Line (DSL) Transceivers" Telecommunication Standardization Sector of ITU. Jun. 2006.

Office Action issued in corresponding Chinese Patent Application No. 200610072439.0; issued Aug. 12, 2010.

Office Action issued in corresponding Chinese Patent Application No. 201110071981.5, mailed Oct. 10, 2011.

Office Action issued in corresponding Indian Patent Application No. 4478/KOLNP/2008, mailed May 22, 2013, 2 pages.

* cited by examiner

METHOD AND DEVICE FOR PERFORMING COMMUNICATION IN DIGITAL SUBSCRIBER LINE

CROSS-REFERENCE TO RELATED APPLICATIONS

This is a continuation of U.S. patent application Ser. No. 12/249,659, filed on Oct. 10, 2008, and titled "METHOD AND DEVICE FOR PERFORMING COMMUNICATION IN DIGITAL SUBSCRIBER LINE", which is a continuation of PCT application No. PCT/CN2007/000196, filed on Jan. 18, 2007, and titled "A METHOD AND DEVICE FOR PERFORMING COMMUNICATION IN DIGITAL SUBSCRIBER LINE TECHNOLOGY", which claims the priority of Chinese patent application No. 200610072439.0, filed on Apr. 13, 2006, and titled "METHOD AND DEVICE FOR PERFORMING COMMUNICATION IN DIGITAL SUBSCRIBER LINE TECHNOLOGY", the entire contents of all of which are incorporated herein by reference.

FIELD

The present embodiments relate to a communication technique, especially to a method and a device for performing communication in digital subscriber line technology.

BACKGROUND

After several years of development, ADSL (asymmetric digital subscriber line) technology has developed from the first generation to ADSL2 (second generation ADSL), ADSL2+ (ADSL2 with downlink bandwidth being extended) and more recent VDSL2 (second generation very high rate digital subscriber line). The frequency band being used is increasing gradually, and the bandwidth is also increasing gradually. The ADSL and ADSL2 employ a frequency spectrum below 1.1 MHz in downlink and are able to provide a maximum downlink rate of 8 Mbps, the ADSL2+ extends the downlink bandwidth to 2.2 MHz and is able to provide a maximum downlink rate of 24 Mbps, and the VDSL2 can even employ a frequency spectrum up to 30 MHz and is able to provide a maximum access rate of 100 Mbit/s which is symmetrical in uplink and downlink. The above digital subscriber line technologies are totally called as xDSL.

Because the transmission medium for the xDSL is an unshielded twisted-pair, and electromagnetic coupling exists between different twisted-pairs, the signal transmitted on a twisted-pair may be transmitted to another twisted-pair through electromagnetic coupling to form a crosstalk. To reduce such a crosstalk, the twisted-pairs adopt different pitches, and the xDSL adopts differential signal transmission and reception, to counteract the common mode interference signal as far as possible by using the symmetry of twisted-pairs. However, in reality, the symmetry of twisted-pairs is relative and the crosstalk still exists. In addition, the interference signal in the ambient environment may also be coupled to the twisted-pairs, because the symmetry of twisted-pairs is limited and the interference signal can be converted into a differential mode signal to cause interference.

The crosstalk between pairs may greatly affect the service. For example, when a pair 1 is trained, its adjacent lines have no service, and a higher activate rate can be achieved with respect to a given signal to noise ratio margin. Hereafter, the adjacent lines also start to training, and signals emitted from these lines cause a crosstalk signal on the pair 1, which may result in a noise increase that may reach to ten and more dBs.

At this time, the originally set signal to noise ratio margin of the pair 1 (generally of 6 dB) cannot ensure the operation at the original bit error rate and rate by the lines. At this time, the better case may result in an increased bit error rate, and the worse case may result in link break and re-training, causing a service interruption. This problem can be more serious in case of VDSL2. Because the VDSL2 means a higher frequency and a shorter line, and the remote crosstalk increases with the frequency and decreases with the increase of distance, the crosstalk has a greater influence. The ADSL2+ defines a fast training mode. Although the fast re-training may recover the connection within a minimum duration of 3 seconds, an influence to the service cannot be completely avoided. Moreover, some services such as voice over IP may require to re-connect due to problems such as link drop, and therefore, keeping a good communication connection quality (for example, no link drop) may be very important to service quality and user experience.

In the prior art, there are three kinds of solutions to solve the crosstalk caused by changing the adjacent line from unusable still state (in the silent state, there is no signal in the line) to normal use. The above three kinds of technical solutions will be respectively described in the following.

Solution one, by increasing the target Signal to Noise Ratio (SNR) margin of the pair 1, a larger signal to noise ratio margin is reserved when training the pair 1, so that when the crosstalk suddenly increases, the communication can still keep the target bit error rate as long as the increase does not reach to or exceed the target signal to noise ratio margin, and there is an enough margin to avoid the re-training. This solution has the benefits of simplicity and practicability, but also the deficiency that increasing the signal to noise ratio margin may a reduced rate that can be achieved on the pair 1. Moreover, because the crosstalk noise is generally not flat, that is to say, noise power spectrum densities at different frequency points are different, and the signal to noise ratio margin is a flat value such that substantially equal values are reserved as margins for signal to noise ratios of all the sub-channels, in view of a fact that the crosstalk is serious only in some frequency ranges, a too higher signal to noise ratio will waste the transmission capacity in the frequency bands where the crosstalk influence is very small.

Solution two is a seamless rate adaptation (SRA) solution. When the signal to noise ratio of the line reduces due to the crosstalk, the SRA solution ensure the signal to noise ratio margin by reducing the number of bits modulated on the sub-carriers being affected, so that the bit error rate is not higher that the target value. According to this solution the bit allocating can be adjusted automatically according to the noise distribution, so as to avoid the problem of solution one. However, because it is necessary in the SRA solution to calculate and update bit tables and gain tables for the sub-carriers (bit allocation tables and gain adjustment tables for the sub-carriers in case of multiple carrier communication. See ADSL or VDSL standard of ITU-T), the amount of the data is very large. Limited by transmission capability of the channel for transmitting the overhead, the solution has a lower response speed. However, the crosstalk from the adjacent lines suddenly increases at the moment of entering the training, and therefore the re-training may be performed due to consecutive failures, before completing the adjustment to the transceiver. Further, it is necessary in the SRA solution to transmit a lot of data (bit and gain table) between the receiving device and the transmitting device. However, the signal to noise ratio of the channel has reduced, and the process of updating the bit and gain tables may fail due to errors.

Solution three, in the ITU-T G.993.2 standard (also called VDSL2), a concept of virtual noise (VN) is introduced, which is a noise obtained by shaping as required. FIG. 1 shows a relation between the virtual noise and the actual noise, where the dashed line represents a virtual noise variation curve and the solid line represents a noise variation curve. If such a virtual noise is used to calculate the signal to noise ratio and the bit load of each of the sub-carriers is calculated, a VN based line rate can be obtained. By setting an appropriate VN not lower than the maximal possible crosstalk noise in a basic bundled unit of the cable (for example, in case of VDSL, for a basic unit of 25 pairs, the VN is setting as not lower than the crosstalk generated when 24 pairs of lines are activated at the same time), the pair 1 will not suffer a re-training even if these pairs are trained after the pair 1 reaches the Showtime (a term for special use in the standard, also called operating state) Moreover, because of adopting a shaped noise, enough margins are only reserved on the required sub-channels to avoiding the waste due to simply setting a flat target signal to noise ratio margin. However, this solution is still a conservative solution because of the following reason. For security, it is required to design the VN according to the maximal possible crosstalk noise, for example, the worst case of 1%. However, the crosstalk is not so bad actually in many cases, or is in the worst case only during a very short period, so that the solution always running in this conservative mode can still making the waste of channel capacity.

SUMMARY

The embodiments provide a method and system for performing communication in digital subscriber line technology. The transmission rate may be adapted according to the noise change in the line, the anti-noise ability may be improved in order to avoid various problems (such as, link drop) caused by the large increase of line noise. The method and system are especially applicable to the case that the noise suddenly has a large increase in a short time. When the line noise is reduced, the line rate may be dynamically increased, thereby improving the transmission capacity.

A method of performing communication in digital subscriber line technology, including: acquiring a communication performance parameter; and using, by the first transceiver and the second transceiver, a predetermined communication rule to perform communication when the communication performance parameter reaches or exceeds a predetermined value.

A transceiver in digital subscriber line technology, including: a receiving module configured to receive a signal from a subs criber line; a monitor module configured to acquire a communication performance parameter based on the received signal from the receiving module; and a processing module configured to perform a switch according to a predetermined communication rule based on the line quality parameter from the monitor module.

A transceiver system in the digital subscriber line technology, including: a first transceiver and a second transceiver for communicating through a subscriber line.

The first transceiver obtains a communication performance parameter, and the first transceiver and the second transceiver use a predetermined communication rule to perform communication when the communication performance parameter reaches or exceeds a predetermined value.

According to the embodiments, a bit table and a gain table are determined in advance and the determined bit table and gain table are respectively saved in the first transceiver and the second transceiver, or a calculation rule that can be understood and used by the first transceiver and the second transceiver is determined in advance. When a large wideband noise (for example, crosstalk) presents, a fast switch from the currently used bit table and gain table to the bit table and gain table determined in advance is performed by using a simple message or query-response mechanism, or a new bit table and gain table are calculated by using the currently used bit table and gain table according to the rule determined in advance and a fast switch to the new bit table and gain table is performed. Because it is not necessary to exchange the bit table and gain table between the first transceiver and the second transceiver, the solutions according to the embodiments have the advantages of fast switch speed and high reliability. When the above wideband noise decreases (for example, the user of a crosstalk source turns off the modem), the SNRM may be calculated according to the current channel, and the frequency spectrum utilization may be increased by increasing the rate through the SRA.

DETAILED DESCRIPTION OF THE EMBODIMENTS

Figure 1:
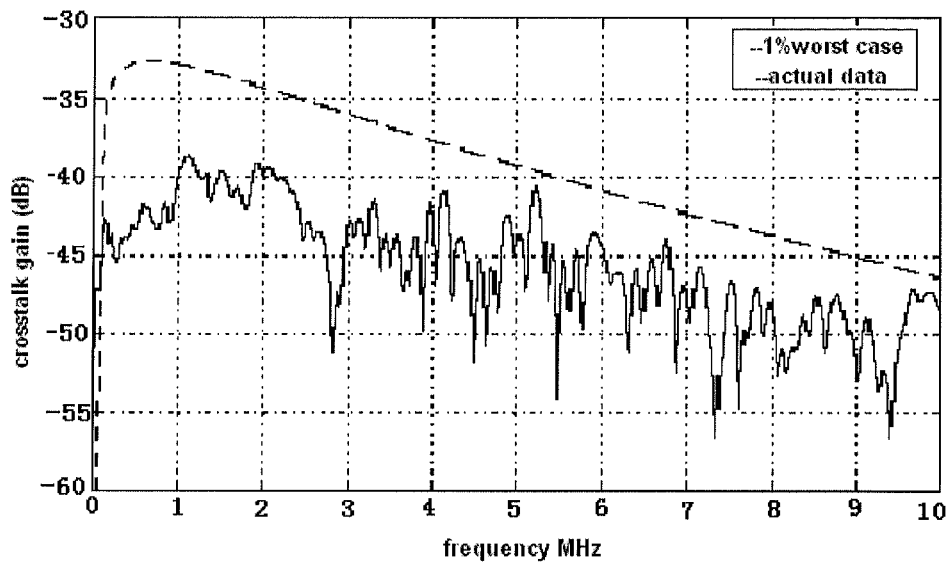
FIG. 1 shows an example about the relation between the virtual noise the actual noise.
Figure 2:
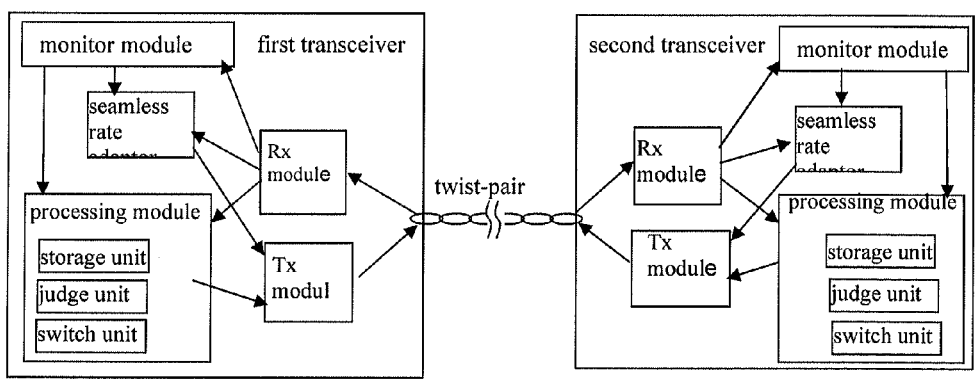
FIG. 2 shows a schematic diagram of a receiving system according to one embodiment.

As shown in FIG. 2, one embodiment discloses a transceiver system in the digital subscriber line technology, including: a first transceiver configured to acquire a communication performance parameter; and a second transceiver configured to acquire a communication performance parameter. When the communication performance parameter reaches or exceeds a predetermined value, the first transceiver communicates with a second transceiver according to a predetermined communication rule which is provided in the first transceiver, or based on the parameters in a bit table and a gain table calculated according to the actual noise. When the communication performance parameter reaches or exceeds a predetermined value, the second transceiver communicates with the first transceiver according to a predetermined communication rule which is provided in the second transceiver, or based on the parameters in a bit table and a gain table calculated according to the actual noise.

The configuration and the function of the first transceiver are the same as that of the second transceiver. One of them may be arranged at the office side, and another of them may be arranged at the subscriber side. The transceivers includes: a receiving module configured to receive a signal and a message from the peer transceiver; a monitor module configured to obtain a communication performance parameter from the acquiring, the communication performance parameter including signal to noise ratio, signal to noise ratio margin and bit error rate; a processing module configured to perform the switch of the predetermined communication rule according to the communication performance parameter from the monitor module and generate a switch message, and perform the switch for the predetermined communication rule according to the switch message, the predetermined communication rule including the bit table and/or the gain table; a transmitting module configured to transmit a signal and the switch message generated by the processing module to the peer transceiver.

The processing module includes: a storage unit configured to store the bit tables and the gain tables respectively according to the two communication rules and the bit tables and the gain tables calculated according to the actual noise, and some configuration parameters such as switch threshold for triggering the bit tables and the gain tables (bi & gi) defined according to the bit error rate or the signal to noise ratio margin; a judgment unit configured to judge whether the communication performance parameter reaches or exceeds the predetermined value, and if the communication performance parameter reaches or exceeds the predetermined value, generate a switch message and transmitting the switch message to the peer end through the transmitting module, wait for a synchronization signal from the peer end, and initiate a switch unit if the synchronization signal is obtained from the peer end within a predetermined time; the switch unit configured to switch to the predetermined bit table and the predetermined gain table.

The transceivers also includes: a seamless rate adaptor configured to calculate a bit table and a gain table according to the actual noise, and take them as a new communication rule to increase the rate when the noise decreases. The receiving module is also configured to receive the bit table and the gain table transmitted from the peer end and the transmitting module is also configured to transmit the bit table and the gain table to the peer end.

The embodiments also disclose a method of performing communication in the digital subscriber line technology, including: obtaining a communication performance parameter; judging whether the communication performance parameter reaches or exceeds the predetermined value, if the communication performance parameter reaches or exceeds the predetermined value, notifying the peer transceiver through a message and making the transceivers of both ends to using parameters in the predetermined bit table and the predetermined gain table to perform the communication, and if the communication performance parameter does not reach or exceed the predetermined value, making them to use parameters in the bit table and the gain table calculated according to the actual noise to perform the communication.

To obtain the communication performance parameters, the monitor module continues to monitor the signal received by the receiving module, and obtains the communication performance parameters such as signal to noise ratio, signal to noise ratio margin and bit error rate from the received signal, so as to notify the peer transceiver when one or more of these parameters reach or exceed predetermined values. Therefore, the transceivers of both ends adopt parameters in the predetermined bit table and the predetermined gain table to perform the communication.

Upon obtaining the communication performance parameter, the judgment module judges whether the communication performance parameter reaches or exceeds the predetermined value. If the communication performance parameter reaches or exceeds the predetermined value, the peer transceiver is notified through a message and the transceivers of both ends are instructed to use parameters in the predetermined bit table and the predetermined gain table to perform the communication. If the communication performance parameter does not reach or exceed the predetermined value, the transceivers of both ends are instructed to use parameters in the bit table and the gain table calculated according to the actual noise to perform the communication.

To judge whether the communication performance parameter reaches or exceeds the predetermined value, a virtual noise or experiential bit table calculating parameter, a signal to noise ratio margin threshold and/or a bit error rate threshold may be pre-set in the first transceiver (assuming that the first transceiver is arranged at the office side) before the training. The experiential bit table calculating parameter is a bit number reduced from the bit number calculated according to the actual noise to provide the bit number of the signal to noise ratio margin on each tone (sub-frequency band), then the virtual noise or experiential bit table calculating parameter, the signal to noise ratio margin threshold and/or the bit error rate threshold as set are saved in the storage module of the first transceiver. In order to send the virtual noise or experiential bit table calculating parameter, the signal to noise ratio margin threshold and/or the bit error rate threshold to the second transceiver (assuming that the second transceiver are arranged at the subscriber side) through information interaction in the training process, and the second transceiver saves the virtual noise or experiential bit table calculating parameter, the signal to noise ratio margin threshold and/or the bit error rate threshold in the storage module. In the training, the processing module of the second transceiver calculates two sets of signal to noise ratio table, bit table and gain table respectively based on the preset virtual noise or experiential bit table calculating parameter and the actual noise: SNRvi, Bvi and Gvi, and SNRri, bri and Gri, and saves the SNRvi, Bvi and Gvi, and the SNRri, bri and Gri in the local storage module and transmits them to the first transceiver through information interaction, in order to save them in the storage module of the first transceiver. Then the first transceiver and the second transceiver implement the connection based on the SNRri, bri and Gri calculated according to the actual noise.

The process of judging whether the communication performance parameter reaches or exceeds the predetermined value is described as follows. The first transceiver and/or the second transceiver compare the monitored signal to noise ratio, signal to noise ratio margin and bit error rate with the preset thresholds stored in their storage modules. Taking the monitoring of the signal to noise ratio margin as an example, when it is found that the signal to noise ratio margins of multiple sub-carriers (according to the power distribution of the crosstalk, there are many consecutive sub-carriers in most cases), for example, 10 sub-carriers, are lower than the preset thresholds, which indicates a case where the training of an adjacent pair causes a sudden increase of the crosstalk, the transceiver generates a switch message and transmits the switch message to the peer transceiver. Upon receiving the switch message, the peer transceiver switches to the bit table and the gain table calculated based on the virtual noise or experiential bit table calculating parameter, and then returns a confirmation message and a synchronization message (it is also possible to only return a synchronization message). Upon receiving the confirmation message and the synchronization message, the transceiver switches to the bit table and the gain table calculated based on the virtual noise. Thus, the first transceiver and the second transceiver can perform the communication by using the bit table and the gain table calculated from the virtual noise.

The predetermined bit table and the predetermined gain table may be obtained according to the preset virtual noise or may be an experiential bit table.

The virtual noise may be the noise in case of the worst line crosstalk. Thus, in the training, in addition to obtaining a signal to noise ratio table SNRri, a bit table Bri and a gain table Gri according to the actual noise on the U-interface (an interface between the xDSL transceiver and the external twisted-pair), the first transceiver and the second transceiver also calculate another corresponding data (SNRvi, Bvi and Gvi) according to the preset virtual noise or experiential bit table calculating parameter. The signal to noise ratio table SNRri, the bit table Bri and the gain table Gri respectively represent the signal to noise ratio, the number of carried bits and the relative gain adjustment coefficient of each sub-carrier. (SNRvi, Bvi and Gvi) are respectively saved in the storage modules of the first transceiver and the second transceiver. When the transceiver detects that the signal to noise ratio SNRi and/or the signal to noise ratio margin SNRMi and/or the bit error rate BER reach or exceed a preset value due to the crosstalk generated by training the adjacent pair, the transceiver transmits a switch message to the peer end transceiver, so that the peer end transceiver switches to the Bvi and the Gvi calculated according to the saved virtual noise or experiential bit table calculating parameter, and the synchronous switch between the first transceiver and the second transceiver is implemented through the switch synchronization signal.

The experiential bit table may be obtained by experience, for example, according to experiential distribution of the crosstalk. By subtracting a corresponding bit number from the actual noise-based bit gain table Bri & Gri obtained according to the training result (the increase of signal to noise ratio margin caused by the subtracted bit number should be greater than or equal to the decrease of signal to noise ratio margin caused by the crosstalk), it is necessary to design the virtual noise and transmit it the peer end, thereby further simplifying the operations.

Because the bit load and gain adjustment table calculated according to the virtual noise is a very conservative solution, although the signal to noise ratio margin and the bit error rate meet the requirement (usually reach or exceed the requirement), the resultant rate is lower than the value in case of actual noise. The line rate may be increased step-by-step according to the actual SNRri. Accordingly, a fast decreasing rate may be obtained to accommodate the sudden increase of noise, and to slowly increase the rate to accommodate the dynamic rate adjustment process with the noise being reduced. Because the line parameters in this fast switch process are calculated in advance, and saved in the first transceiver and the second transceiver, the switch can be implemented only through a simple message and a synchronization message when it is necessary to perform the switch. This is much faster and more reliable than the original SRA or BS, because the SRA or BS needs to transmit the updated bit table and gain table. In case of SRA or BS, a failure may occur in transmitting the bit table and the gain table due to the bit errors in the transmission process, if the channel is poor. The solution according to the embodiment will not cause this problem, and when the line crosstalk noise decreases, the signal to noise ratio increases and the bit error rate decreases, so that a large amount of data required by the SRA can be transmitted.

When entering the showtime, the signal to noise ratio table SNRri, the bit table Bri and the gain table Gri calculated according to the actual noise may act as transmission parameters, to achieve a higher transmission rate.

Figure 3:
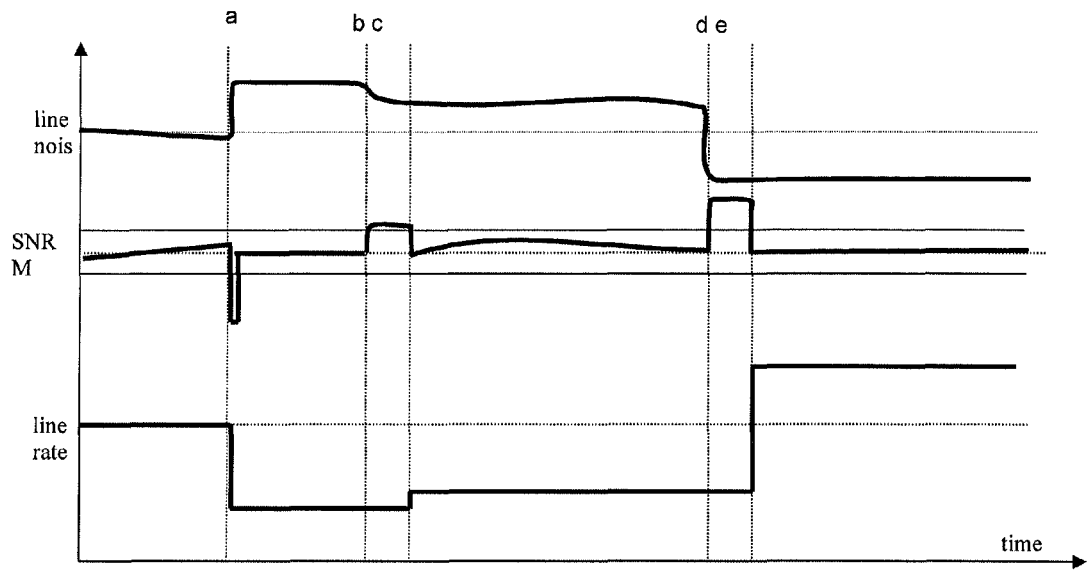
FIG. 3 shows a schematic diagram of the relation between the line noise, the signal to noise ratio margin and the line rate according to one embodiment.

FIG. 3 shows a diagram of the relation between the line noise, the signal to noise ratio margin and the line rate. As shown in FIG. 3, the abscissa axis represents time, and the relation between the line noise, the signal to noise ratio margin and the line rate are shown by the ordinate. At time a, because the adjacent pair starts the training to greatly increase the line noise and sharply reduce the SNRM, according to the embodiment, the switch to a predetermined bit gain table is performed to reduce the rate. During the period from time b to time c, when the training of the adjacent pair completes, the adjacent pair enters a power control phase and the crosstalk decreases, i.e., the line noise decreases, so that the SNRM increases. Thus, according to the embodiment, the rate may be adjusted through the SRA to increase the line rate. During the period from time d to time e, when the subscriber of the adjacent pair turns off the modem, the crosstalk greatly decreases, i.e., the line noise greatly decreases, so that the SNRM increases. Thus, according to the embodiment, the rate may be adjusted through the SRA to increase the line rate.

To implement the embodiments, a switch message is also defined. In the standard for VDSL2 (ITU-T G.993.2), an eoc (embedded overhead channel) message for an OLR command is defined. The command type field is $(00000001)_2$, subscript 2 represents binary, and other fields are defined in the following tables.

| Name | Length (octets) | Octet number | Content |
|---|---|---|---|
| Request Type 1 | $5 + 4 \times N_f$ ($N_f \leq 128$) | 2 | $04_{16}$ (NOTE) |
| | | 3 to 4 | 2 octets for the number of sub-carriers $N_f$ to be modified |
| | | 5 to $4 + 4 \times N_f$ | $4 \times N_f$ octets describing the sub-carrier parameter field for each sub-carrier |
| | | $5 + 4 \times N_f$ | 1 octet for SC |
| Request Type 2 | For further study | 2 | $05_{16}$ (NOTE) |
| | | All others | Reserved by the ITU-T |
| Request Type 3 | For further study | 2 | $06_{16}$ (NOTE) |
| | | All others | Reserved by the ITU-T |

(NOTE)
All other values for octet number 2 are reserved by the ITU-T

TABLE 11-7

| | /G.993.2 Reason codes for OLR responses | | | |
|---|---|---|---|---|
| Reason | Octet value | Applicable to Defer Type 1 | Applicable to Reject Type 2 | Applicable to Reject Type 3 |
| Busy | $01_{16}$ | X | X | X |
| Invalid parameters | $02_{16}$ | X | X | X |

According to the above table, Type 1 has been used, and according to the embodiment, Type 2 or Type 3 may be used. The length of the fields is set to 2 octets, and the contents of the second octets are respectively (as shown in the table): $05_{16}$, $06_{16}$, where subscript 16 represents hex. aother message Type 4 may be defined, whose length is 2 octets, the content of the second octet being $07_{16}$. Therefore, the definitions in the current standard are not affected. As such, the format of the response message corresponding to the switch message is as shown in the following table.

| Name | Length (octets) | Octet number | Content |
| --- | --- | --- | --- |
| Defer | 3 | 2 | $81_{16}$ (NOTE) |
| Type 1 Request | | 3 | 1 octet for reason code (Table 11-7) |
| Reject Type 2 Request | 3 | 2 | $82_{16}$ (NOTE) |
| | | 3 | 1 octet for reason code (Table 11-7) |
| Reject Type 3 Request | 3 | 2 | $83_{16}$ (NOTE) |
| | | 3 | 1 octet for reason code (Table 11-7) |
| IACK | 3 | 2 | $8B_{16}$ (NOTE) |
| | | 3 | 1 octet for SC |

(NOTE)
All other values for octet number 2 are reserved by the ITU-T

Therefore, if the existing Type 2 or Type 3 is directly adopted, corresponding message fields are modified. The length of a message for granting the switch is 2 octets, where the second octet is $72_{16}$ or $73_{16}$ (corresponding to the message type). The length of a message for rejecting the switch is 3 octets, where the second octet is $82_{16}$ or $83_{16}$ (corresponding to the message type), and the third octet is the cause for rejecting (alternatively, if the cause is not needed, the length is 2 octets). The length in case of newly defined Type 4, a response Type 4 is defined and the length of a message for granting the switch is 2 octets, where the second octet is $73_{16}$, and the length of a message for rejecting the switch is 3 octets, where the second octet is $83_{16}$, and the third octet is the cause for rejecting (alternatively, if the cause is not needed, the length is 2 octets). The synchronization signal is based on the signal defined in G.993.2, i.e., the synchronization signal is represented by switches between all-0 and all-1 of synchronization symbols.

In the above method, the messages have more capacity, and thus are able to facilitate the communication between two parties. To increase the switch speed, a switch message Type 2 or Type 3 or Type 4 may be transmitted without acknowledgement, and then the transceiver executes the switch action upon receiving this message, and instructs the receiving end through synchronization symbols to execute the synchronous switch. If rejected, the synchronization message is not transmitted. Thus, the transmission and parsing process of the message content is avoided, thereby increasing the switch speed and reducing the error probability.

According to the above embodiment, two sets of parameters are calculated in advance in the training, where one set is a bit table and gain table obtained according to the current channel parameter (for example, channel noise), and another set is a conservative bit table and gain table obtained according to the virtual noise or experiential bit table calculating parameter. These two sets of parameters are saved in the first transceiver and the second transceiver at the same time. When the training is completed, the transceiver uses the bit table and the gain table obtained according to the current channel parameter, called current bit table and gain table, and this bit table and gain table is dynamically adjusted with the change in the channel (for example, bit swapping). When a very large wide band noise (for example, crosstalk) presents, a fast switch from the current bit table and gain table to the bit table and gain table corresponding to the virtual noise is performed by using a simple message. Because it is not necessary to exchange the bit table and gain table and only a simple message is exchanged, compared with the bit exchange, the solutions according to the embodiments have the advantages of fast switch speed and high reliability. When the above wideband noise decreases (for example, the user of a crosstalk source turns off the modem), the SNRM may be calculated according to the current channel parameter, and the frequency spectrum utilization may be increased by increasing the rate through the SRA.

In addition, because the switch speed in the solutions according to the embodiment is fast, link drops may be avoided by responding to the feature of sudden increasing of the crosstalk. In case of SRA, failures are likely to occur because of response speed and errors in the parameter exchange process, thereby causing the re-training and interrupting the service.

To obtain the communication performance parameter, the following query-response mode may be adopted. Specifically, the line quality is determined according to the result of query-response. The method of obtaining the line quality through the query-response mode is described as follows.

Figure 4:
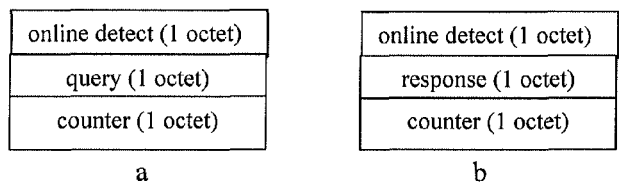
FIG. 4 shows a schematic diagram of a query message and a response message according to one embodiment.

As shown in FIG. 4, a query message and a response message are constructed. FIG. 4 (a) shows the query message, and FIG. 4 (b) shows the response message. It is assumed that the first transceiver transmits the query message to the second transceiver.

Figure 5:
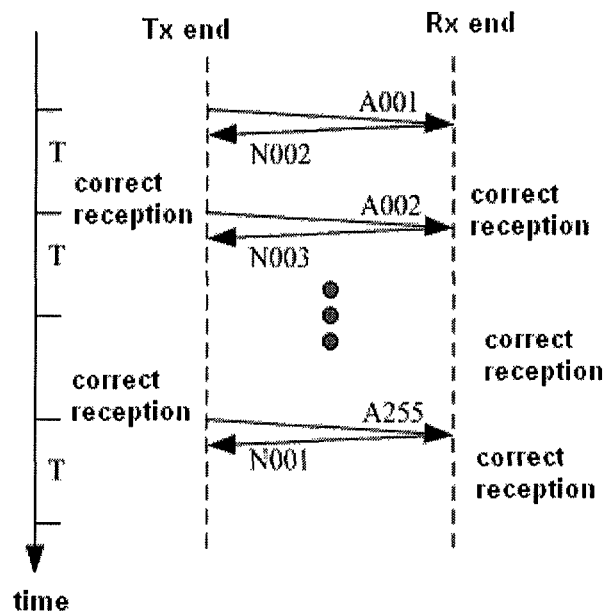
FIG. 5 shows a query-response process between the first transceiver and the second transceiver according to one embodiment.

When the counter in the query message received by the second transceiver is X (X falls within the range of 0-255), the message is responded immediately, and the counter octet in the responded response message should be X+1. If an overflow occurs, the value of the counter octet is set to zero. When the first transceiver receives the response message and the content of the counter octet is valid, a query message is transmitted after a time interval (T), and the content of the counter octet is that of the valid counter octet received from the second transceiver. The further course is similar to the above. FIG. 5 shows a query-response process between the first transceiver and the second transceiver.

Figure 6:
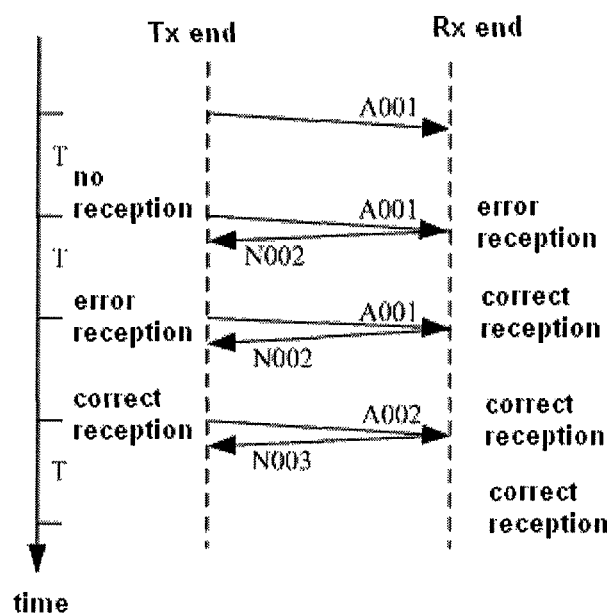
FIG. 6 is a schematic diagram showing the case where a failure occurs in the query-response process between the first transceiver and the second transceiver according to one embodiment.

As shown in FIG. 6, when the second transceiver does not correctly receive the query message from the first transceiver, the second transceiver does not respond. When the first transceiver does not correctly receive the response message from the receiving end, the first transceiver will continually re-transmit the query message identical to the previous one at a prescribed time point.

To record the result of query-response, a register may be provided in the first transceiver and the second transceiver, the bits of which respectively record receiving status of n consecutive messages. To facilitate the description, the registers in the first transceiver and the first transceiver are represented respectively with TM and RM. After initialization or after a bit table entry switch, the initial values of the TM and the RM should be zero.

For the first transceiver, within the current time frame, the first transceiver writes '1' in the current bit of the TM if no valid response message is received within the prescribed time interval, and writes '0' if a valid response message is received within the prescribed time interval. Then, the first transceiver receives the response message within the next time frame, determines the next bit of the TM as the current bit, and writes '1' in the current bit of the TM if no valid response message is received within the prescribed time interval, and writes '0' if a valid response message is received within the prescribed time interval.

For the second transceiver, within the current time frame, the second transceiver writes '1' in the current bit of the RM if no valid query message is received within the prescribed time interval, and writes '0' if a valid query message is received within the prescribed time interval; then, the second transceiver receives the query message within the next time frame, determines the next bit of the RM as the current bit, and writes '1' in the current bit of the RM if no valid query message is received within the prescribed time interval, and writes '0' if a valid query message is received within the prescribed time interval.

In the first transceiver, when a predetermined number (i.e., switch threshold) of bits in the TM register are set to '1', a decision is made to perform the switch at a time agreed on between the first transceiver and the second transceiver, for example, to perform the switch of bit table and gain table at the tenth symbol of the next synchronization frame. To ensure the synchronous switch, keep transmitting invalid data after the switch is decided, so that the second transceiver reaches the switch condition as soon as possible, and thus the switch of bit table and gain table is performed at the tenth symbol of the next synchronization frame. Thus, without the need to transmit the switch message between the first transceiver and the second transceiver, the synchronous switch of bit table may be implemented, to cope with various problems such as link drop caused by sudden increase of the line noise (for example, crosstalk). The same mechanism is adapted for the second transceiver in order to perform the switch of bit table.

Figure 7:
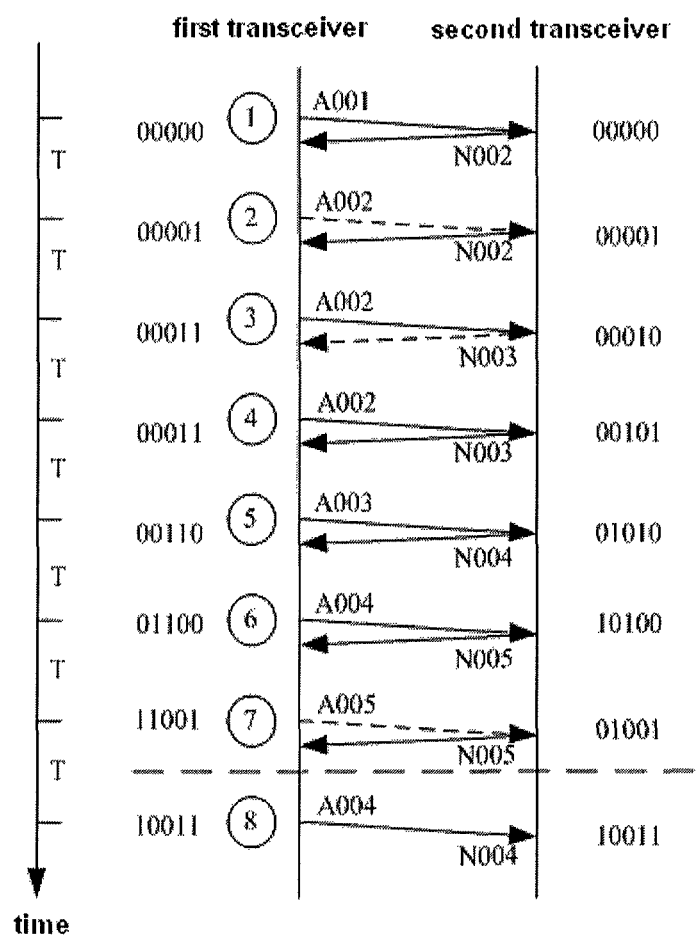
FIG. 7 shows a schematic diagram of performing a bit table switch by using the query-response process between the first transceiver and the second transceiver according to one embodiment.

FIG. 7 shows a case of query-response where the TM and the RM have 5 bits and the switch threshold is 3. As shown in FIG. 7, the solid line represents that the present message transmission is correct, and the dashed line represents that the present message transmission is wrong. In the first time frame, the first transceiver transmits a query message having a counter octet of 001 to the second transceiver, and upon receiving the query message; the second transceiver returns a response message having a counter octet of 002 to the first transceiver. At this time, the bits in the TM and the RM of the first transceiver and the second transceiver do not change, i.e., all are 0. In the second time frame, the TM and the RM respectively shift by one bit circularly in a forward direction, the first transceiver transmits a query message having a counter octet of 002 to the second transceiver, and not receiving the query message, the second transceiver still returns a response message having a counter octet of 002 to the first transceiver. At this time, the current bit (the last one bit as shown in the figure) in the TM and the RM of the first transceiver and the second transceiver are all set to 1. In the third time frame, the TM and the RM respectively shift by one bit circularly in a forward direction, the first transceiver transmits a query message having a counter octet of 002 to the second transceiver, and upon receiving the query message, the second transceiver's receiving is correct, the current bit in the RM of the second transceiver keeps to 0, and then the second transceiver returns a response message having a counter octet of 003 to the first transceiver. Because the first transceiver does not receive the response message within the prescribed time interval, the current bit in the TM of the first transceiver is set to 1. Similar to these, when reaching to the 7th time frame, the number of '1's (switch threshold) in the TM of the first transceiver reaches to 3, and from the 8th time frame, the first transceiver transmit a query message having a wrong counter octet to the second transceiver, so that the number of Ts in the RM of the second transceiver reaches to the switch threshold as soon as possible, in order to perform the switch of bit table at the tenth symbol of the next synchronization frame. Because it is not necessary to re-transmit the message between the first transceiver and the second transceiver, the synchronous switch of bit table can be implemented, and the solutions according to the embodiments have the advantages of fast switch speed and high reliability. When the above wideband noise decreases (for example, the user of a crosstalk source turns off the modem), the SNRM may be calculated according to the current channel parameter, and the frequency spectrum utilization can be increased by increasing the rate through the SRA, thus increasing the transmission speed.

When performing the switch of bit table, the switch of gain table may or may not be performed.

In summary, a bit table and gain table are determined in advance, and the determined bit table and gain table are respectively saved in the first transceiver and the second transceiver. When a very large wide band noise (for example, crosstalk) presents, a fast switch from the current bit table and gain table to the previously determined bit table and gain table is performed by using a simple message or a query-response mechanism. Because it is not necessary to exchange the bit table and gain table between the first transceiver and the second transceiver, the solutions according to the embodiments have the advantages of fast switch speed and high reliability. When the above wideband noise decreases (for example, the user of a crosstalk source turns off the modem), the SNRM may be calculated according to the current channel parameter, and the frequency spectrum utilization may be increased by increasing the rate through the SRA.

Although the present invention has been described in connection with the embodiments, those skilled in the art know that, there can be many variations and changes to the present invention without departing from the spirit and substance of the present invention, and the scope of the present invention is defined by the appended claims.

The invention claimed is:

1. A communication method for a digital subscriber line (DSL) system comprising a first transceiver and a second transceiver which are connected each other, comprising:
   obtaining a communication performance parameter;
   calculating, at a first transceiver, a first table including a parameter of bit allocation for sub-carriers in a multiple carrier communication;
   when the communication performance parameter reaches or exceeds the predetermined value, transmitting, from the first transceiver to the second transceiver, a switch message for requesting the second transceiver to switch to a second table including a parameter of bit allocation for sub-carriers, wherein the second table is not sent from the first transceiver to the second transceiver and calculated at the second transceiver based on a calculation rule to keep the parameter of bit allocation for sub-carriers within the second table as same as the parameter of bit allocation for sub-carriers within the first table calculated at the first transceiver;
   from a certain symbol, communicating at the first transceiver with the second transceiver using the first table at the first transceiver to implement synchronous switch;
   wherein the parameter of bit allocation within the first table is calculated at the first transceiver by subtracting a corresponding bit number from a current table including a parameter of bit allocation for sub-carriers.

2. The method according to claim 1, wherein the certain symbol is $n^{th}$ symbol in a time frame, n indicating a symbol count.

3. The method according to claim 1, wherein the communication performance parameter comprises at least one of a signal to noise ratio, a signal to noise ratio margin and a bit error rate.

4. The method according to claim 1, wherein the parameter of bit allocation for sub-carriers within the first table is calculated at the first transceiver after the communication performance parameter is determined to reach or exceed the predetermined value.

5. The method according to claim 1, wherein the parameter of bit allocation for sub-carriers within the first table is calculated and stored at the first transceiver before the communication performance parameter is determined to reach or exceed the predetermined value.

6. A transceiver in a digital subscriber line (DSL) system, comprising:
- a receiving module configured to receive a signal from a subscriber line;
- a monitor module coupled to the receiving module and configured to obtain a communication performance parameter;
- a processing module coupled to the monitor module and configured to calculate a first table including a parameter of bit allocation for sub-carriers in a multiple carrier communication, and generate a switch message for requesting an opposite transceiver to switch to a second table including a parameter of bit allocation for sub-carriers when the communication performance parameter reaches or exceeds a predetermined value, and execute a synchronous switch to the first table from a certain symbol, wherein the second table is not sent by the transceiver to the opposite transceiver and calculated at the opposite transceiver based on a calculation rule to keep the parameter of bit allocation for sub-carriers within the second table as same as the parameter of bit allocation for sub-carriers within the first table calculated at the transceiver;
- a transmitting module coupled to the processing module and configured to transmit the switch message through the subscriber line to the opposite transceiver;
- wherein the parameter of bit allocation within the first table is calculated by subtracting a corresponding bit number from a current table including a parameter of bit allocation for sub-carriers.

7. The transceiver according to claim 6, wherein the certain symbol is $n^{th}$ symbol in the time frame, n indicating a symbol count.

8. The transceiver according to claim 6, wherein the communication performance parameter comprises at least one of a signal to noise ratio, a signal to noise ratio margin and a bit error rate.

9. The transceiver according to claim 6, wherein the parameter of bit allocation for sub-carriers within the first table is calculated after the communication performance parameter is determined to reach or exceed the predetermined value.

10. The transceiver according to claim 6, wherein the parameter of bit allocation for sub-carriers within the first table is calculated and stored at the transceiver before the communication performance parameter is determined to reach or exceed the predetermined value.

11. A communication method for a digital subscriber line (DSL) system comprising a first transceiver and a second transceiver which are connected each other, comprising:
- receiving, at the first transceiver from the second transceiver, a switch message for requesting the first transceiver to switch to a first table including a parameter of bit allocation for sub-carriers in a multiple carrier communication, wherein the switch message is sent from the second transceiver when a communication performance parameter reaches or exceeds a predetermined value;
- in response to the switch message, calculating at the first transceiver the first table based on a calculation rule to keep the parameter of bit allocation for sub-carriers within the first table as same as a parameter of bit allocation for sub-carriers within a second table calculated at the second transceiver;
- from a certain symbol, communicating at the first transceiver with the second transceiver using the first table at the first transceiver to implement synchronous switch;
- wherein the parameter of bit allocation for sub-carriers is calculated at the first transceiver by subtracting a corresponding bit number from a current table including a parameter of bit allocation for sub-carriers.

12. The method according to claim 11, wherein the certain symbol is $n^{th}$ symbol in a time frame, n indicating a symbol count.

13. The method according to claim 11, wherein the communication performance parameter comprises at least one of a signal to noise ratio, a signal to noise ratio margin and a bit error rate.

14. A transceiver in a digital subscriber line (DSL) system, comprising:
- a transmitting module configured to transmit a signal to an opposite transceiver through a subscriber line;
- a receiving module configured to receive through the subscriber line a switch message for requesting the transceiver to switch to a first table including a parameter of bit allocation for sub-carriers in a multiple carrier communication, wherein the switch message is sent from the opposite transceiver when the communication performance parameter reaches or exceeds a predetermined value;
- a processing module configured to in response to the switch message, calculate the first table including the parameter of bit allocation for sub-carriers based on a calculation rule to keep the parameter of bit allocation for sub-carriers within the first table as same as a parameter of bit allocation for sub-carriers within a second table calculated at the opposite transceiver, and execute a synchronous switch to the first table from a certain symbol;
- wherein the parameter of bit allocation for sub-carriers within the first table is calculated by subtracting a corresponding bit number from a current table including a parameter of bit allocation for sub-carriers.

15. The transceiver according to claim 14, wherein the certain symbol is $n^{th}$ symbol in a time frame, n indicating a symbol count.

16. The transceiver according to claim 14, wherein the communication performance parameter comprises at least one of a signal to noise ratio, a signal to noise ratio margin and a bit error rate.

* * * * *